March 7, 1967  D. F. WHEELER ETAL  3,307,351
PLURALITY OF GAS TURBINE ENGINES TORQUE RESPONSIVE TO
SHARE EQUALLY IN DRIVING A COMMON LOAD
Filed July 17, 1964  4 Sheets-Sheet 1

INVENTORS
DEAN F. WHEELER
RALPH P. McCABE
WARREN H. COWLES
WILLIAM C. LARSON
BY
ATTORNEY

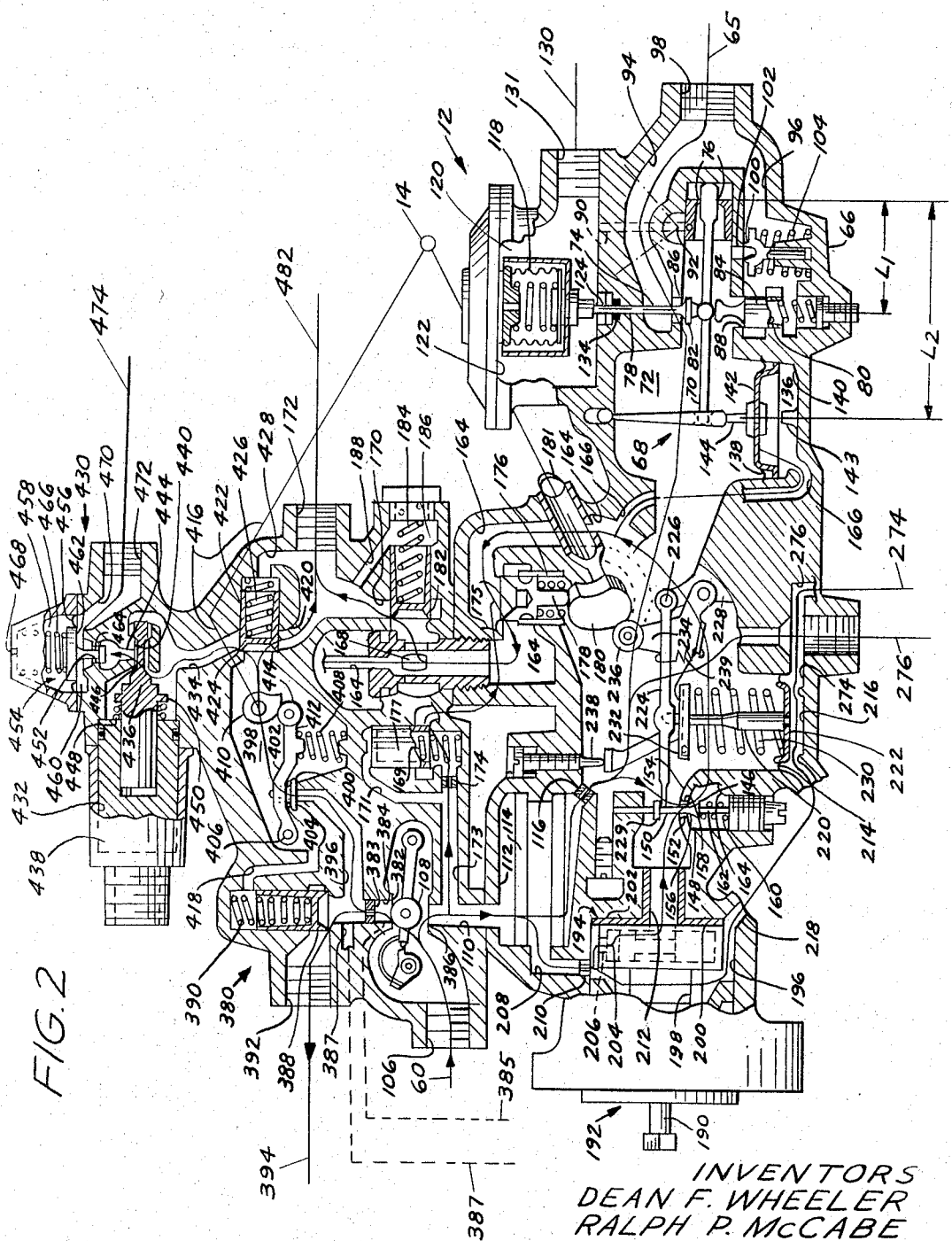

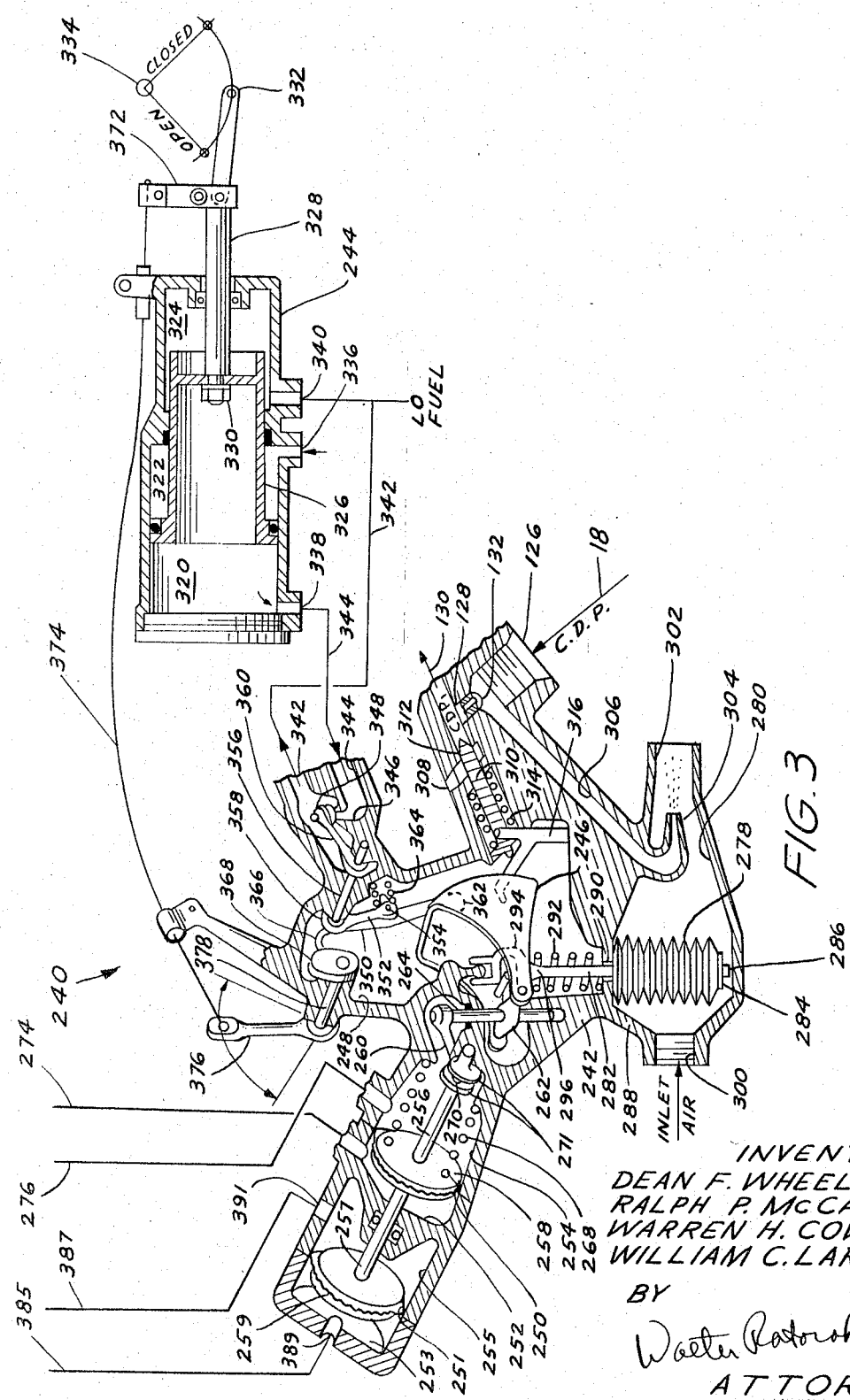

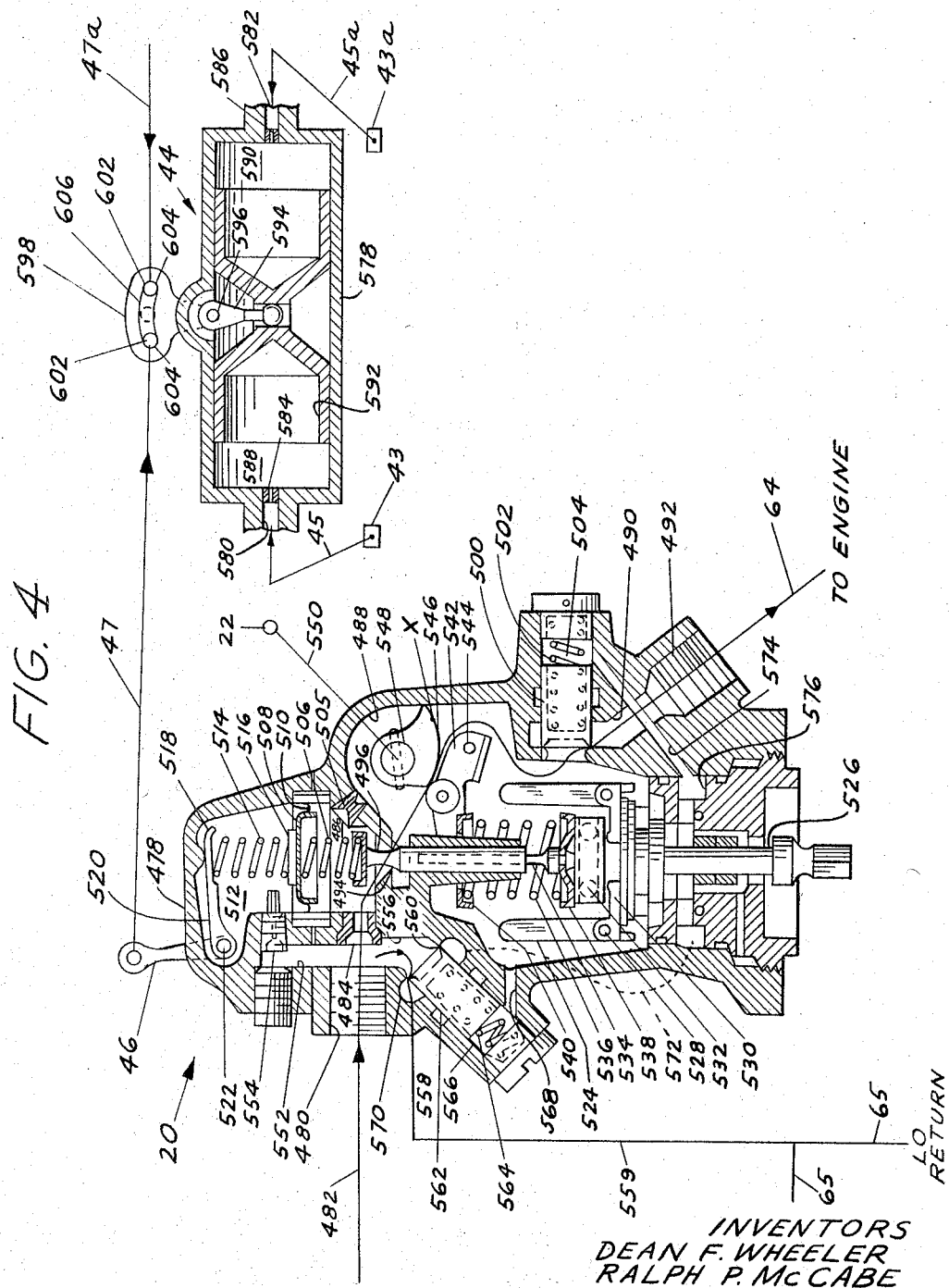

United States Patent Office 3,307,351
Patented Mar. 7, 1967

3,307,351
PLURALITY OF GAS TURBINE ENGINES TORQUE RESPONSIVE TO SHARE EQUALLY IN DRIVING A COMMON LOAD
Dean F. Wheeler, Detroit, Ralph P. McCabe, Warren, Warren H. Cowles, Birmingham, and William C. Larson, Utica, Mich., assignors to Holley Carburetor Company, Warren, Mich., a corporation of Michigan
Filed July 17, 1964, Ser. No. 384,047
10 Claims. (Cl. 60—39.15)

This invention relates generally to gas turbine engine controls, and more particularly to fuel and/or compressor bleed controls for gas turbine engines.

It is well known that parameters such as pressure, speed and temperature may be used individually and/or collectively in fuel systems or in compressor bleed systems for controlling and determining the operation of gas turbine power plants. However, the means heretofore employed in fuel systems to sense these various parameters and to provide corresponding input signals or control forces have generally been rather complex, often involving squared factors resulting from the restriction or orifice type flow usually employed.

A novel means for eliminating the necessity of coping with squared flow factors, resulting a much less expensive and more compact fuel control system, has been disclosed in U.S. application, Ser. No. 264,117, filed on March 11, 1963 in the name of Warren H. Cowles, now abandoned. A control wherein the same metering valve that measures the metered fuel flow and produces a linear relationship between metered fuel flow and pressure drop also serves as a gas producer governor valve during the governing process, thus eliminating the need for a separate governing valve, has been disclosed in U.S. application, Ser. No. 355,540, filed on March 30, 1964, in the name of Warren H. Cowles.

This invention embodies many of the features of the fuel control systems disclosed by the above referenced applications, as well as other novel features producing a number of advantages over previously known fuel and/or compressor bleed systems.

Accordingly, it is a general object of the invention to provide a light-weight, compact hydromechanical computing type combined fuel control and compressor bleed control operative in response to novel pressure, temperature and speed sensing means.

Another object of the invention is to provide such a control which may be used with either turbojet or turboshaft engines.

A further object of the invention is to provide means for coordinating the fuel flow from two such controls for use with two engines which are driving a single output device, such as a set of helicopter blades.

A still further object of the invention is to provide such a control wherein a single novel three-dimensional cam arrangement serves to modulate the bleeding-off of compressor discharge air and to control the actuation of a compressor bleed valve, both functions being responsive to speed and temperature.

An additional object of the invention is to provide such a control which includes additional means for manually controlling fuel flow and compressor bleed, when this is desired.

Still another object of the invention is to provide such a control wherein metered fuel is supplied to the igniter when the primary fuel system is operative, and unmetered fuel is supplied thereto when the manual fuel system is operative.

Other objects and advantages of the invention will become more apparent when reference is made to the following specification and the accompanying drawings wherein:

FIGURE 2 is a schematic cross-sectional view of one of the fuel controls shown in FIGURE 1;

FIGURE 3 is a schematic cross-sectional view of one of the compressor bleed controls shown in FIGURE 1;

FIGURE 4 is a schematic cross-sectional view of the power sharing control and one of the power turbine governors shown in FIGURE 1;

Figure 1:
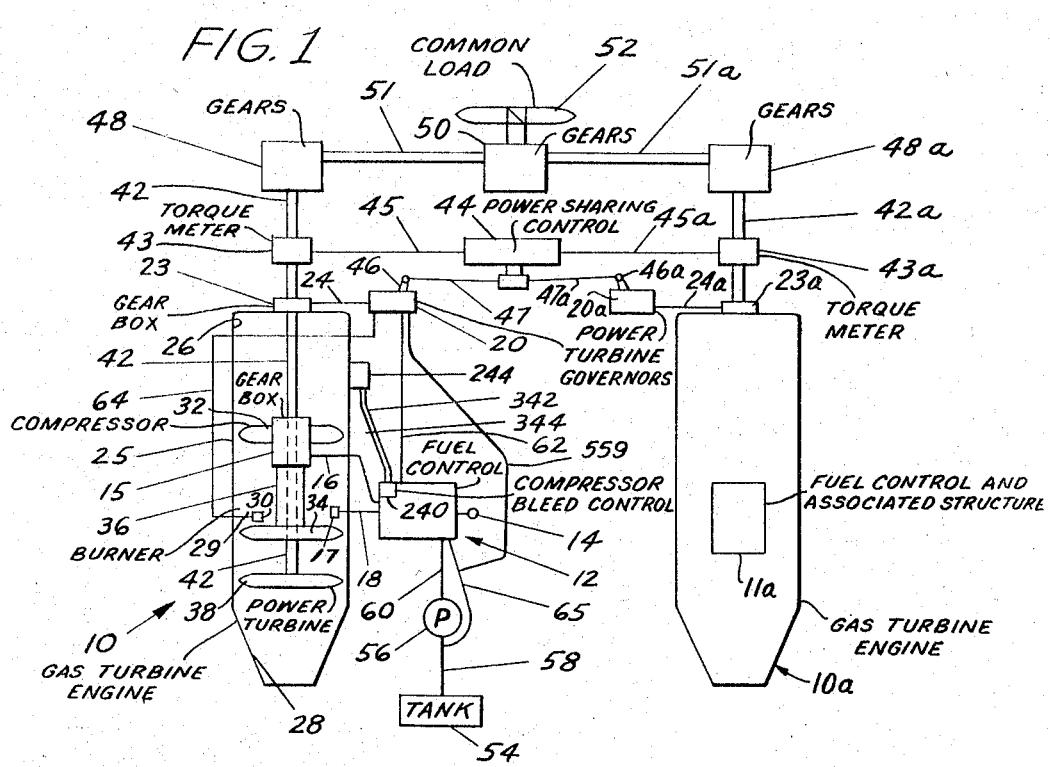
FIGURE 1 is a fragmentary schematic illustration of a pair of gas turbine engines driving a single device, each engine having a fuel system including a fuel control, a compressor bleed control and a power turbine governor and the two engines having a single power sharing control, all constructed in accordance with the invention.

Referring now to the drawings in greater detail, FIGURE 1 illustrates schematically a pair of twin spool gas turbine engines 10 and 10a, each having a fuel control 12 which is responsive to manual control by means of a power lever 14, to engine gas producer speed by means of a gear box 15 and transmission line 16 and to compressor discharge pressure by means of a pressure probe 17 and conduit 18, the control 12 having associated therewith a power turbine governor 20 which is responsive to manual control by means of a power lever 22 and power turbine engine speed by means of a gear box 23 and transmission line 24. The reference numerals for all duplicate structure for engine 10a also have the subscript a.

While the fuel control 12 shown and to be described herein is responsive to particular parameters, it should be understood that certain novel features of the invention may be employed in a fuel control responsive to other parameters, such as temperature and engine pressures other than that specified above. As to these features, no limitations are intended by the particular parameters employed in the present disclosure for purposes of illustration.

A typical gas turbine engine 10 includes an outer housing 25 having an air intake 26 and exhaust nozzle 28. A burner or combustion chamber 29 having a fuel distribution ring 30 therein is located within the housing 25 between the compressor 32 and the forward turbines 34. The power plant is of the split turbine type which has its forward turbines 34 driving the compressor 32 by means of a hollow shaft 36. The power turbine 38 may drive a propeller, or, in the case of the turboshaft engine illustrated, a gear box 48 by means of a second shaft 42 which is concentric with the hollow shaft 36. Since turbojet and turboshaft engines are basically identical, it is evident that all considerations necessary for a successful fuel control for a turbojet engine would be the same as those for a turboshaft engine fuel control. It is, of course, to be further understood that the invention is not limited to the particular type of turboshaft engine illustrated.

In the instant application, each of the power turbine shafts 42 includes a torque meter 43 which transmits a hydraulic signal to a novel power sharing control comparator-actuator 44 via a conduit 45 for a purpose to be described. The control 44 is operatively connected, by means of suitable linkage such as a cable 47, to a lever 46 of each of two power turbine governors 20. A gear 48 on each of the shafts 42 is connected, by suitable shafts 51, to a set of gears 50 for driving the helicopter blades represented schematically as 52.

The fuel supply system for each engine 10 generally comprises a fuel tank 54, a pump 56, which may be a fixed displacement type and is usually but not necessarily driven by the engine 10, and supply conduits 58 and 60 for delivering fuel to the fuel control 12. The fuel control 12 meters the correct fuel flow for the particular engine operating requirements, as dictated by the above mentioned engine speed and compressor discharge pressure parameters, in a manner which will be described below. Correctly metered fuel is transferred from the fuel control 12 to the fuel distribution ring 30 via a conduit 62, the power turbine governor 20, and a second conduit 64, any excess fuel being bypassed back to the inlet side of the pump 56 through a return conduit 65, in a manner to be described.

It should be understood that the structure, such as the fuel control 12 and all of the elements connected thereto, shown in association with engine 10 is duplicated for engine 10a. Thus, any such elements not shown in FIGURE 1 are represented generally at 11a.

BASIC ACCELERATION FUEL SYSTEM

As seen in FIGURE 2, each fuel control 12 comprises a plural cavity housing 66 formed in any suitable manner and containing an acceleration fuel system 68. The system 68 includes a force balance lever 70 pivotally secured to the fuel control housing 66 in one of the chambers 72 therein. A valve stem 74 is pivotally connected to the lever arm 70 at a predetermined distance $L_1$ from the pivot members 76 of the lever 70, so as to be positioned substantially perpendicular to the lever arm 70. The ends 78 and 80 of the valve stem 74 may be slidably confined within the walls of the housing 66. Two spaced shoulders 82 and 84 formed on the stem 74 function in co-operation with a pair of annular openings or valve seats 86 and 88 formed within the housing 66 as a pair of valves.

Fuel density variations may be compensated for by manually moving the lever 90 which pivots about the pin 92 to vary the location of the pivot members 76, and hence the length $L_1$.

A pair of passageways 94 and 96 communicate between the openings 86 and 88 and an outlet 98 leading to the conduit 64 which returns to the inlet side of the pump 56. The passageway 96 may include a pressure relief valve 100 which is urged closed against an opening 102 between the chamber 72 and the passageway 96 by a spring 104. Access to the chamber 72 is via the conduit 60 and the inlet 106, past the normally open valve 108, through the passageway 110, into the chamber 112, through the cylindrical filter 114 and the restriction 116.

An evacuated bellows 118 in another chamber 120 of the housing 66 is fixedly attached at its one end to a wall 122 of the housing 66 in any suitable manner. The other end of the evacuated bellows 118 is secured to an extension 124 of the valve stem 74.

Compressor discharge air pressure, CDP, enters an inlet port 126 via the conduit 18 (see FIGURE 3) and thence communicates with the chamber 120 by means of passageways 128 and 130 and inlet 131, the passageway 128 including a fixed restriction 132 which serves to stabilize the system and produces a reduced pressure $CDP_1$. The compressor discharge pressure $CDP_1$ is referenced to absolute zero by virtue of the bellows 118 being evacuated.

A low pressure seal 134 is sufficient to separate the air chamber 120 from the low pressure fuel passageway 94 adjacent the high pressure fuel chamber 72. In view of its position in a low pressure area, the seal 134 may be an ordinary diaphragm, if desired.

A third chamber 136 is formed by incorporating a so-called feedback diaphragm 138 in a recess 140 formed in a wall of the chamber 72, the washer 142 being fastened in the usual manner to the diaphragm 138. A stop 143 may be formed in the chamber 136 against which the washer 142 secured to the feedback diaphragm 138 will occasionally abut. A stem 144 extends from the diaphragm 138 into the chamber 72 and is pivotally attached to the lever arm 70 at a second predetermined distance $L_2$ from the fixed pivot point 76.

A so-called linear restrictor valve 146 is located in another chamber 148 formed within the housing 66. This valve 146 may include a stem 150 which extends through an opening 152 in the wall 154 and into the chamber 72 for a purpose to be described later. The valve 146 includes a surface 156 which is specially contoured so as to produce a linear relationship between metered flow and pressure drop across the valve. The contoured surface 146 serves as a variable orifice valve by virtue of its reciprocal movement relative to a valve seat 158 formed at the mouth of the opening 152. A spring 160 surrounding the valve extension 162 urges the valve 146 toward the seat 158, and passageways 164 and 166 communicate between the valve chamber 148 and the feedback chamber 136.

The passageway 164 additionally communicates with a port 168 and a passageway 170 leading to an outlet 172. Still another passageway 173, including a fixed restriction 174, communicates between the passageways 110 and 164, upstream of a spring biased shut-off valve 175 which may be included in a chamber 176 adjacent the passageway 164. Should the linear restrictor valve 146 be closed against its seat 158, minimum flow to the passageway 164 would be controlled by a valve 177 downstream of the restriction 174. The valve 177 is urged open by a spring 169 and closed by the pressure drop across the restriction 174, the latter due to the upstream branch passageway 171.

An extension 178 from the valve 175 is contacted by a cam 180 which is operatively connected through suitable linkage 181 to the power lever 14. A pressurizing valve 182, suitable for providing a back pressure on the system and normally urged closed by a spring 184, is included in a chamber 186 adjacent the passageway 170. A branch passageway 188 communicates downstream pressure from the passageway 170 to the chamber 186 behind the valve 182.

GAS PRODUCER GOVERNOR SYSTEM

The transmission line 16 (FIGURE 1) is connected between the gear box 15 driven by the gas producer shaft 36 and the shaft 190 (FIGURE 2) extending from the hydraulic governing system 192 of the fuel control 12. As illustrated in FIGURE 2, a hydraulic speed sensing unit 194 of a conventional centrifugal type is attached to the shaft 190 for rotation therewith within a chamber 196. The speed sensing unit 194 may be substantially comprised of a generally tubular center portion 198 which has formed thereon or secured thereto a pair of radially extending members 200 and 202, the member 202 having an axial bore containing a centrifugal valve 204. The valve 204 is thus adapted to control fluid flow through port 206 in the member 202 in accordance with the speed of the engine 10. Flow to the port 206 is via a passageway 208, having a fixed restriction 210 formed therein, which communicates between the chambers 112 and 196. Flow downstream of the port 206 is via a passageway 212 to the chamber 72.

A diaphragm 214 forms a movable wall between the chamber 72 and still another chamber 216, and a passageway 218 communicates between the chambers 196 and 216. A member 220 extends from the diaphragm washer 222 into the chamber 72 so as to contact a governor lever arm 224, the latter being pivotally supported at its one end on a pivot pin 226 secured to a projection 228 of the housing 66. The lever arm 224 is of sufficient length to at times engage a projection 229 of the stem extension 150 of the linear restrictor valve 146. A spring 230 is confined between the washer 222 and a movable spring retainer 232 surrounding the member 220. A lever 234, pivotally attached to the projection 228, includes a roller 236 which is movable in response to the position of the rotatable cam 180 connected to the manual selector lever 14 through the linkage 181. An adjustable stop 238 extends into the chamber 72 so as to limit the clockwise movement of the lever 234 and to control the minimum opening of the orifice 146–152 during idle conditions, due to contact of the stem 150 by the lever arm 224, the latter being connected to the lever 234 by a spring 239. The minimum amount of fuel which flows past the linear restrictor valve 146, as a result of the setting of the adjustable stop 238, is in addition to the minimum flow permitted by the valve 177, as previously discussed.

THREE DIMENSIONAL CAM BIAS AND BLEED CONTROL

A compressor discharge pressure bias and bleed control mechanism 240, illustrated in FIGURE 3, may be included as an integral part of the housing 66 or be mounted as separate assemblies 242 and 244. The assembly 242 includes a three-dimensional cam 246 housed in a chamber 248, the cam 246 being operatively connected to conventional washer-supported diaphragms 250 and 251 which form movable walls between chambers 252 and 254 and between chambers 253 and 255, respectively. The specific connection is through an extension 256 from the diaphragm washer 258, a pair of levers 260 and 262 and an intermediate shaft 264. A rigid member 257 connects the diaphragm washers 258 and 259 through a wall separating the chambers 252 and 255. As the diaphragm 250 is caused to move, in a manner to be described, against the force of a spring 268 located in the chamber 254, one end 270 of the lever 260, being confined between a pair of flanges 271 formed on the extension 256, is moved in an arc about the other fixed end 272, thereby rotating the shaft 264, the lever 262 and the cam 246. The chambers 252 and 254 are in communication with the passageways 274 and 276 leading from the feedback chamber 216 and the central chamber 72, respectively, for a purpose to be described.

A set of bimetallic thermostatic disks 278 are stacked in another chamber 280 of the body 242 around a stem 282, the disks 278 being confined between a retainer 284 formed on the end of 286 of the stem 282 and a wall 288 of the chamber 280. The stem 282 extends through an opening 290 in the wall 288 into the chamber 248. A spring 292, mounted between the wall 288 and a spring retainer 294 formed on the other end 296 of the stem 282, surrounds the portion of the stem 282 which extends into the chamber 248. Depending upon the disks 278 selected, an increase or a decrease in temperature would cause the disks 278 to contract, thereby permitting the spring 292 to urge the spring retainer 294 further upwardly. Since the retainer 294 is pivotally connected to the lever 262, the cam 246, in this instance, would be pivoted upwardly about the lever 262.

The chamber 280 further includes an inlet 300, an outlet 302 and an aspirator 304, the latter serving as a suction device for the air entering the inlet 300. A passageway 306 communicates between the CDP inlet 126 and the aspirator 304.

A bleed port 308 communicating to the atmosphere branches off the passageway 130, the amount of discharge occurring through port 308 being controlled by a valve 310 which is urged away from its seat 312 by a spring 314. A linkage member 316, having one end in contact with the valve 310, urges the valve 310 closed when rotated in response to pivotal movement of the cam 246 by the compression or expansion of the disks 278. The valve 310 serves to bleed off compressor discharge air once it exceeds a predetermined value as a result of an increase or decrease in temperature of some selected medium. In other words, in a particular engine it may be desirable to bleed off CDP when a particular higher regenerator temperature is reached or when ambient temperature decreases below a preselected value as a result of an increase in altitude.

The bleed control unit 244 contains three variable chambers 320, 322 and 324 due to the movement of a slidable slave piston 326 therein. A linkage member 328 is fixedly secured at its one end 330 to the right end of the piston 326 and at its other end 332 is operatively connected to a bleed valve, represented generally by 334, which serves to bleed compressor pressure to the atmosphere from a preselected intermediate compressor stage, as shown schematically in FIGURE 1. An inlet 336 communicates high pressure or pump outlet fuel into the chamber 322. Ports 338 and 340 are formed in the walls of the chambers 320 and 324, and passageways 342 and 344 communicate between the ports 338 and 340, respectively, and the housing 242. A port 346 formed in the wall of the housing 242 at times communicates between the passageways 342 and 344 depending upon the position of a compressor bleed servo valve 348.

Movement of the valve 348 is controlled in part by the pivotal movement of the three dimensional cam 246. This is accomplished by means of a lever 350, a link 352 which is pivotally connected to a pin 354 intermediate the ends of the lever 350, a shaft 356 fixedly secured to the free end 358 of the link 352, and a second link 360 also fixedly secured to the shaft 356 at its one end and having the servo valve 348 formed on its other end. One end 362 of the lever 350 is urged into continual contact with the cam 246 by means of a spring 364 mounted against a wall of the chamber 248. The other end 366 of the lever 350 is in continual contact with a second cam 368 whose rotational movement is controlled by a feedback system between the bleed control unit 244 and the CDP bias unit 242. The feedback system 370 may include a member 372 fixedly secured to the rod 328 and having a suitable flexible connection 374 running from the linking member 372 to a lever 376 which is operatively connected to the cam 368 by means of a shaft 378 located in a wall of the housing 242. The operation of the bleed control in conjunction with the three dimensional cam 246 will be explained later.

MANUAL CONTROL SYSTEM

The manual control portion 380 of the fuel control 12 comprises a conventional manually controlled lever (not shown) which is operatively connected to the valve 108 for pivotally moving the valve 108 between a seat 382 formed at the inlet to a passageway 384 and a seat 386 formed at the inlet of the passageway 110 entering the basic acceleration fuel system 68. A fixed restriction 383 is located in the passageway 384 and a pair of passageways 385 and 387 branching off from opposite sides of the restriction 383 and communicating with chambers 253 and 255, respectively, through ports 389 and 391, for a purpose which will be described.

A valve 388 urged closed by a spring 390 tends to block off flow from the passageway 384 to an outlet 392 connected by a conduit 394, similar to the conduit 65 of the basic control, to the upstream side of the pump 56. A passageway 396 communicates between the passageway 384 and a chamber 398 formed in the housing 66, the opening of the outlet from the passageway 396 into the chamber 398 being controlled by a valve 400. A member 402, operatively connected to the valve 400 through a spring 404, is pivoted about its one end 406 against the force of the spring 408 by a cam 410 adjacent the free end 412 thereof. The latter may include a roller 414, if desired. Movement of the cam 410 is manually controlled by the power lever 14 through suitable linkage, represented generally by 416.

A passageway 418 communicates between the chamber 398 and the spring side of the valve 388. Another passageway 420 communicates between the chamber 398 and the outlet 172, the opening between the chamber 398 and the passageway 420 being controlled by a valve 422 which is urged closed against a seat 424 by a spring 426. A branch passageway 428 communicates between the outlet 172 and the spring side of the valve 422.

IGNITER FUEL REGULATOR

The igniter fuel regulator 430 (see FIGURE 2) includes a chamber 432 formed in the housing 66. A passageway 434 communicates between the chamber 432 and either the chamber 398 of the manual control system 380 or the passageway 164 of the basic acceleration fuel system 68, depending upon which system is being operated.

A valve 436, operated by a solenoid 438, is slidably mounted in a small diameter portion 440 of the chamber 432 for providing a variable opening leading to a passageway 444. So long as the solenoid 438 is not energized, the valve 436 is maintained against a seat 446 by a spring 448, the latter being mounted between the front face of the solenoid 438 and a flange 450 formed on the valve 436.

The outlet 452 of the passageway 444 is controlled by a pressure regulator 454 which includes a diaphragm 456 forming a movable wall between chambers 458 and 460, a diaphragm washer 462 having a stem 464 formed thereon which extends across the chamber 460 and through the opening 452, and a spring 466 mounted against the wall of the chamber 458. The chamber 458 is exposed to the atmosphere by means of an opening 468 formed in a wall thereof. A passageway 470 communicates between the chamber 460 and an outlet 472, the latter being in communication with the igniter system (not shown) of the engine 10 via a conduit 474.

POWER TURBINE GOVERNOR

The power turbine governor 20, illustrated in FIGURE 4, may be formed as an integral part of the fuel control housing 66 or be mounted on the engine 10 as a separate housing 478. The governor 20 includes an inlet 480 connected to a conduit 482 leading from the main fuel control outlet 172, a fixed restriction 484 located between the inlet 480 and a chamber 486, a central chamber 488, a passageway 490 and an outlet 492 which is in communication with the fuel distribution ring 30 via the conduit 64. The opening 494 between the chambers 486 and 488 is controlled by a contoured governor valve 496, and the opening 498 between the chamber 488 and the passageway 490 is controlled by a throttling valve 500 which is urged closed by a spring 502 mounted in a chamber 504. Minimum flow between the chambers 486 and 488 is limited by a fixed restriction 505.

The governor valve 496 is urged open by a spring 506 mounted in the chamber 488 against a washer 508 secured to a diaphragm 510 which forms a movable wall between the chamber 486 and another chamber 512. A spring 514 is mounted in the chamber 512 between a washer 516 mounted on the other side of the diaphragm 510 and the free end 518 of a lever 520 pivoted about its other end on a pivot pin 522 which is rotatably mounted through a wall of the housing 478. The previously mentioned lever 46 is fixedly secured to the pin 522 outside the housing 478, for a purpose to be described.

A pair of flyweights 524 are pivotally mounted in the central chamber 488 and operatively connected to the gear box 40 of the power turbine shaft 42 by a shaft 526 which is rotated by the transmission line 24 (FIGURE 1). As the flyweights 524 pivot outwardly about the pivot pins 528 in response to an increase in speed of the shaft 42, legs 530 formed on the flyweights 524 contact the underside of a bearing member 532 which is in direct contact with a stem 534 extending from the contoured valve 496, causing the stem 534 to be raised in the chamber 488. The stem 534 is urged downwardly by a spring 536 mounted between a retainer 538 secured to the stem 534 adjacent the member 532 and a second retainer 540 which is loosely fitted around an intermediate portion of the stem 534.

A lever 542 pivotally mounted about a pin 544 in the central chamber 488 is maintained in contact with a cam 546 which is also pivotally mounted in the central chamber 488. The cam 546 is rotated about a pivot 548 by the power lever 22 through suitable linkage 550. A branch conduit 552 and a fixed restriction 554 communicate between the inlet 480 and the chamber 512. Another branch passageway 556 communicates between the inlet 480 and a bypass outlet 558 which may be connected to the low pressure return conduit 65 by a branch conduit 559. The size of the opening 560 between the branch passageway 556 and the outlet 558 is controlled by a bypass valve 562 which is urged closed by an adjustable spring 564 mounted in a chamber 566. A passageway 568 communicates between the chamber 566 and the central chamber 488. Low pressure fluid may be communicated between the annulus 570 adjacent the bypass outlet 558 and the chamber 504 via passageways 572 and 574 and an annulus 576 formed around the shaft 526.

POWER SHARING CONTROL

The power sharing control 44, illustrated in FIGURE 4, includes a housing 578 having openings 580 and 582 at the two ends thereof. These openings may include fixed restrictions 584 and 586 and are each in communication with one of the torque meters 43 (FIGURE 1) via the conduit 45. The housing 578 includes two chambers 588 and 590 whose volumes are varied by a slidably mounted piston 592. A lever 594 pivotally mounted in the housing 578 is pivoted about a pin 596 by the movement of the piston 592, and a member 598 is fixedly secured to the lever 594 for movement therewith. Movement of the member 598 directly controls movement of the power turbine governor levers 46 through the cables 47 and pins 602. The governor spring 514 serves to hold the pin 602 against the closest edge 604 of a slot 606 formed in the member 598. Movement of the member 598 by the piston 592 changes the force on the spring 514 for a purpose to be described.

OPERATION

Generally, fuel from the tank 54 is supplied via the conduits 58 and 60 to the inlet 106 of the fuel control 12 by means of pump 56 which is usually (but not necessarily) driven by the engine 10 and the capacity of which is more than sufficient to supply the total fuel requirements for any condition of engine operation. The portion of the inlet fuel actually supplied to the engine 10 is, of course, determined either automatically or manually, depending upon the position of the valve 108. With the valve 108 manually positioned against its upper seat 382, fuel flows from the inlet passageway 106 into the basic control chamber 112, through the passageway 110, the filter 114 in chamber 112, the restriction 116 and thence into the chamber 72, past the fixed linear restrictor valve 146, through the passageway 164, the port 168, into the outlet passageway 172 and thence to the power turbine governor 20 through the conduit 482, the fixed restriction 484, the chambers 486 and 488, the passageway 490 and the outlet 492 to the conduit 64 leading to the fuel distribution ring 61.

It will thus be seen that all of the inlet fuel goes to the engine 10, except (1) that fuel which is bypassed from the acceleration fuel system chamber 72 past the valves 82–86 and 84–88 into the passageways 94 and 96 and the outlet 98 and thence back to the inlet of the pump 56 via the return conduit 65 and (2) that fuel which is bypassed from the governor 20 via the passageway 556 and the outlet 558.

The amount of fuel bypassed through the outlet 98 is controlled by the movement of the evacuated bellows 118 in response to compressor discharge pressure, the latter being modulated by the position of the valve 310 (FIGURE 3), as influenced by temperature and speed, through movement of the three-dimensional cam 246.

The operation of the basic closed-loop moment balance system, as well as the effect of the hydraulic gas producer governor system, is not a part of this invention and may be readily understood by those skilled in the art simply by referring to FIGURES 2 and 3. Further, it has been described in detail in the above mentioned U.S. application, Serial No. 355,540, filed on March 30, 1964, in the name of Warren H. Cowles.

A more detailed operation of the various components of the complete fuel control unit 12, insofar as they differ from the above referenced application Serial No. 355,540, will now be discussed.

Referring now to FIGURE 3, the difference in pressure between the hydraulic signals on opposite sides of the diaphragm 250 is indicative of gas producer speed by virtue of the change in pressures in chambers 196 and 72 resulting from the progressive closing off of the port 206 by the valve 204 due to centrifugal force. As the speed of the shaft 190 increases, the pressure differential across the variable opening 204–206 increases, thereby increasing the pressure in the chamber 252 via the conduits 218 and 274 and the chamber 216. This moves the diaphragm 250 and the stem 256 to the right, resulting in the lever 260 and the shaft 264 being rotated in a counterclockwise direction.

Since the link 262 is fixedly secured to the shaft 264, and the cam 246 is secured to the link 262 for rotational movement therewith, the cam 246 will likewise be rotated about the shaft 264 in a counterclockwise direction. When this occurs, the end 362 of the lever 350, being held against the cam 246 by the spring 364, will follow the contour of the cam 246, which, in the structure shown, would cause the end 362 to pivot in a clockwise direction about the end 366. This will result in the link 352, which is secured to the lever 350 by the movable pivot pin 354, also rotating in a clockwise direction about the shaft 356.

As the shaft 356 is thus rotated, the link 360 secured to the other end of the shaft 356 is likewise rotated in a clockwise direction, as observed in FIGURE 3, thereby moving the valve 348 toward the seat formed at the outlet of the port 346. This will decrease the bleed of pressure through the opening 346–348 and hence serve to increase the pressure in the chamber 320 of the bleed control unit 244 and decrease the pressure in the chamber 324. The result will be a movement of the piston 326 to the right, causing the compressor bleed valve 334 to progressively close. The closing action will continue until equilibrium across the piston 326 once again occurs. This equilibrium is brought about as a result of the feedback lever 372 being moved to the right along with the rod 328, thereby rotating the lever 376 in a clockwise direction by means of the flexible connection 374 between the levers 372 and 376. This clockwise movement of the lever 376 will also rotate the cam 368 in a clockwise direction, since both the lever 376 and the cam 368 are secured to opposite ends of the shaft 378.

As the cam 368 rotates, the follower end 366 of the lever 350 will be rotated in a clockwise direction about its pivot, in this instance the other end 362. The link 352 will thus be rotated in a counterclockwise direction about the shaft 356, thereby rotating the link 360 in a counterclockwise direction so as to lift the valve 348 away from the outlet 346–348. When this occurs, pressure from chamber 320 and the passage 344 will bleed off past the valve 348 into the conduit 342 and thence into the chamber 324 to stop the rightward movement of the piston 326 and once again balance the forces on the opposite sides of the piston 326.

A decrease in rotational speed of the shaft 190 would, of course, cause the diaphragm 250 to move to the left and, in reverse of the operation just described, cause the compressor bleed valve 334 to progressively open.

Figure 5:
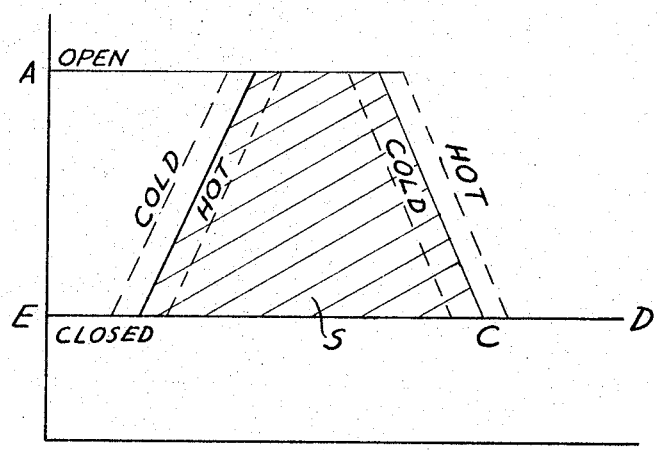
FIGURE 5 is a curve illustrating one of the characteristics of the compressor bleed control system illustrated in FIGURE 4.

The contour of the cam 246 may, for a particular engine, be shaped such that the relationship between the bleed valve 334 position and the speed, N, of the shaft 190 is as illustrated by the solid line curve ABCD of FIGURE 5.

If desired, in order to avoid a particular compressor stall region such as that illustrated by the shaded area S of FIGURE 5, the cam 246 may be contoured so as to produce a bleed valve 334 position vs. speed relationship as illustrated by the curve EFGBCD of FIGURE 5.

Since a typical stall area, such as that illustrated by S of FIGURE 5, varies with changes in temperature, movement of the end 362 of the lever 350 may be influenced in accordance with temperature changes. This is accomplished by the up and down rotational movement of the cam 246 about the pivot link 262, as caused by a compression or expansion of thermostatic disks 278 which are influenced by the temperature present in the chamber 280. The exact vertical contour of the cam 246 would be such that the lines FG and BC of the curve, FIGURE 5, would shift to the right under the influence of a higher temperature, and to the left under the influence of a lower temperature. This is illustrated by the dotted lines marked "hot" and "cold" which are illustrated parallel to the lines FG and BC.

It should also be evident that, as the three-dimensional cam 246 is rotated horizontally and/or vertically in accordance with speed and temperature changes, the valve 310 is slidably moved past the opening between the bleed port 308 and the passageway 130. This, of course, influences the pressure within the bellows chamber 120 (FIGURE 2) and serves to correct the acceleration fuel schedule for both temperature and speed variations, the latter due to changes in altitude, as also described in application Ser. No. 355,540, relative to the FIGURE 3 modification therein.

Control of the bleeding of some intermediate stage of the compressor through the bleed valve 334 in accordance with speed and temperature changes is accomplished whether the basic control 12 or the integral manual control 380 is being used. When the manual control 380 is in operation, the hydraulic speed signal is transmitted to the respective chambers 253 and 255 via the conduits 385 and 387 leading from opposite sides of the fixed restriction 383 in the passageway 384. This is a measure of speed change since the drop in pressure across the restriction 383 is a function of pump flow, and it will rotate the three-dimensional cam 246 in the same manner and for the same purpose as was discussed above relative to the speed indicative pressure differential across the diaphragm 250 between the chambers 252 and 254.

When the manual control system 380 is in use, the valve 108 will be positioned against the lower valve seat 386 by the pilot through suitable linkage (not shown). Fuel will thus flow from the inlet 106 into the passageways 384 and 396, past the valve 400 into the chamber 398, past the valve 424 into the passageway 420, through the outlet 172 and the conduit 482 to the power turbine governor 20 and thence to the engine 10 in the manner previously described. Should the pressure in the passageway 384 exceed the force of the spring 390, the valve 388 would be opened, permitting some fuel to be bypassed back to the inlet side of the pump 56 via the outlet 392 and a conduit 394 which may branch into the regular return line 65.

Fuel flow to the engine 10 will be controlled by manual movement of the power lever 14, as in the case of the basic acceleration fuel system 68, and a corresponding movement of the cam 410 in the chamber 398 would occur through suitable linkage, represented generally by the line 416. Rotational movement of the cam 410, depending upon the direction of movement, would either move the lever 402 downwardly in a clockwise direction about the pivot pin 406 against the force of the spring 408, thereby tending to close the valve 400 against the force of its spring 404, or permit the spring 408 to move the lever 402 upwardly in a counterclockwise direction, thereby serving to decrease the load on the spring 404 and, hence, further open the valve 400 under the influence of high pressure fuel from the passageway 396. Fuel flow from the chamber 398 divides between the passageway 434 leading to the igniter fuel regulator 430 and the outlet 172 leading to the power turbine governor 20, the same as would be true if the basic automatic control 12 were in operation.

The operation of the power turbine governor 20 will now be briefly discussed prior to describing its operation in conjunction with the power sharing control 44.

As will be readily understood by those skilled in the art, once the power lever 14 (FIGURE 1) has been set at its maximum power position, the gas producer governing system 192 will establish the maximum amount of power available, as completely described in the above mentioned U.S. application, Ser. No. 264,117. However, in many applications it may be necessary or desirable to limit the percentage of maximum power output insofar as the equipment being driven by the power turbine shaft 42 and gear 40 is concerned. This is controlled by the second governing system 20.

In this instance, the power turbine governor 20 (FIGURE 4) is an all-speed, flyweight type hydraulic governor that bypasses part of the scheduled fuel when controlling power turbine speed. The bypassed fuel flows past the valve 562, through the outlet 558 and thence through the conduit 559 to the low return line 65, along with that fuel which is being bypassed past the valves 82 and 84 (FIGURE 2) of the acceleration fuel system 68.

Prior to take off, the second manual selector lever 22 would be pivoted so as to rotate the cam 546 in a clockwise direction until some point X thereon is in contact with the lever 542, thus pivoting the lever 542 in a counterclockwise direction about the fixed pivot pin 544 and compressing the spring 536 so as to cause the stem 534 to be moved downwardly. This would progressively open the contoured valving surface 496 relative to the opening 494, thus increasing fuel flow therepast. This would result, of course, in an increased engine speed and, hence, an increase in speed of the power turbine shaft 42 (FIGURE 1) and its governor shaft 526 (FIGURE 4) through transmission line 24. The flyweights 524 would move outwardly, thereby lifting the bearing member 532 and the stem 534 through the arms 530, and thus position the valve 496 so as to bring the opposing forces on it back into equilibrium.

As will also be readily understood by those skilled in the art, the reset portion of the governor 20 may produce an isochronous governing effect. Briefly, this results from the sizing of the reset jet or restriction 484. The graphic result is an increase in slope of the so-called "governor hook" of the common Fuel Flow versus Speed curve, with the "governor hook" being much steeper, in accord with the requirements for isochronous governing. In order to prevent an unstable condition, the dynamic characteristics of the control can be matched with the requirements of the engine in part from the force of the spring 506 opposing the upward movement of the valve 496 due to increased speed, an additional opposing force resulting from the dampening effect of the restriction 554. In other words, as the valve 496 and the spring 506 move upwardly, the diaphragm 510 is raised, forcing the fluid in the upper chamber 512 out through the relatively small restriction 554.

The spring 514 and the lever 520 are included in the chamber 512 to accommodate the influence of the power sharing control 44 on the governor 20. In order that the additional downward force of the spring 514 not alter the slope of the above described "governor hook," its effect may be compensated for by changing the size of the restriction 484 and, if necessary, the contour of the valve 496.

For an application such as the one illustrated in FIGURE 1, it is essential that the power supplied to the gear system 50 by each of the linkages 51 and 51a from the two power turbine shafts 42 and 42a be identical. Should the power output of either shaft change, due to any cause other than movement of the power lever 22, the hydraulic signal from one or the other of the torque meters 43 and 43a would result in pressure in one of the chambers 588 or 590 changing.

Assume for the sake of discussion, that the torque change is such that the pressure in the chamber 588 decreases. The piston 592 will, of course, move to the left and pivot the lever 594 in a clockwise direction about the pivot point 596, thereby rotating the rack 598 in a clockwise direction so as to increase the tension on the left cable 47 of FIGURES 1 and 4 and decrease the tension on the right cable 47a. This will rotate the lever 46 in a clockwise direction against its spring 514 while the lever 46a of the other governor 20a (FIGURE 1) is rotated in a counterclockwise direction by its spring 514a. Since the spring 514 in the chamber 512 is compressed, the valve 496 is moved downwardly to allow additional fuel to flow to the engine 10.

Fuel flow to the second control would, of course, be decreased by virtue of the clockwise rotation of the rack 598 producing a lesser tension on the cable 47a. This would change the power produced by the respective engines until such time as the hydraulic pressures in the chambers 588 and 590 come into equilibrium, indicating that the torque outputs of the two engines are once again equal. Thus, the gears 48 and 48a and their respective linkages 51 and 51a will be synchronized for proper operation of the helicopter blades 52 through the gear system 50.

From the above discussion, it should be apparent that the invention provides novel means for co-ordinating the operation of a plurality of gas turbine engines driving any single output device, such as the helicopter blades 52.

It should also be apparent that the invention provides other novel structures such as a novel three-dimensional cam mechanism for simultaneously modulating the bleeding-off of compressor discharge air and controlling the action of the compressor bleed valve in response to speed and some selected temperature.

The invention is not limited to the control of two engines or one driven device, and certain combinations embodying the invention may be made without including all of the elements shown and described herein. Thus, while but one embodiment of the invention has been shown and described, other modifications are possible, and no limitations are intended except as set forth in the appended claims.

What we claim as our invention is:

1. The combination of a plurality of gas turbine engines each having a free turbine-driven shaft connected to drive a common load device, a burner chamber, a source of pressurized fuel, a fuel conduit between said source of fuel and said burner chamber, a fuel metering valve in said conduit and fuel control means responsive to selected engine operating conditions and connected to said valve for controlling the fuel flow to said burner chamber as a function of said selected operating conditions, said combination including additionally means for comparing directly and independently of any other operating condition only the torque outputs of each of said engines and, if said torque outputs are not equal, for automatically increasing the torque output of the lower torque engine.

2. The combination of a plurality of gas turbine engines each having a free turbine-driven shaft connected to drive a common load device, a burner chamber, a source of pressurized fuel, a fuel conduit between said source of fuel and said burner chamber, a fuel metering valve in said conduit and fuel control means responsive to selected engine operating conditions and connected to said valve for controlling the fuel flow to said burner chamber as a function of said selected operating conditions, said combination including additionally means for comparing directly and independently of any other operating condition only the torque outputs of each of said engines and, if said torque outputs are not equal, for automatically increasing the torque output of the lower torque engine, without normally effecting the torque output of the high torque engine.

3. The combination recited in claim 1, wherein said last mentioned means comprises a separate power turbine governor for each of said engines connected in each of said conduits downstream of said fuel control means so that metered fuel from said fuel control means passes therethrough, and a torque meter connected to each of said engines, said torque meters being connected to a comparator-actuator device, said comparator-actuator device being connected to each of said governors in a manner to increase the torque output of the low torque engine.

4. The combination recited in claim 1, wherein said last mentioned means comprises a separate power turbine governor for each of said engines connected in each of said conduits downstream of said fuel control means so that metered fuel from said fuel control means passes therethrough, each of said governors having a fuel bypass connected by a conduit to the upstream side of said fuel control means, and a torque meter connected to each of said engines, said torque meters being connected to a comparator-actuator device, said comparator-actuator device being connected to each of said governors in a manner to increase the torque output of the low torque engine by restricting the fuel bypass thereof.

5. A combination recited in claim 3, wherein each of said power turbine governors includes a valve, in addition to and completely independent of said upstream valve controlled by said selected engine operating conditions, connected to be influenced by said comparator-actuator means.

6. The combination recited in claim 5, wherein each of said governor valves is positioned by a balance of forces between a speed input and a manual lever and is reset by said comparator-actuator.

7. A combination recited in claim 3, wherein each of said power turbine governors is constructed to provide means for dynamic compensation of the closed loop system comprising said common load device, said engine and said power turbine governor.

8. A combination recited in claim 3, wherein each of said power turbine governors is constructed to provide means proving a time variant droop characteristic in governing.

9. The combination recited in claim 5, wherein each of said governors include additionally a governor spring connected to said governor valve and opposing a power turbine speed input, manual selector means for selecting a governor spring preload, the position of said valve being initially determined by said speed input, and means responsive to said initial change in valve position for repositioning the valve as a function of time, thereby providing a fuel flow response which is a function of valve position.

10. The combination recited in claim 3, wherein said power turbine governor comprises specifically a housing formed to provide first and second chambers communicating through an orifice, an inlet for said first chamber, an outlet from said second chamber, a valve controlling said orifice, a spring in said second chamber for influencing the position of said valve in said orifice, manual means for preloading said spring, governor fly weight means driven by said power turbine for opposing the spring preload and initially positioning the valve for governing purposes, said first chamber being divided by a movable diaphragm, a spring between said valve and the adjacent side of the diaphragm, a spring between the opposite side of said diaphragm and a lever connected to said power sharing mechanism for influencing the position of the diaphragm, a fixed jet communicating said inlet with the valve side of said diaphragm for changing the pressure differential on said diaphragm and thereby permitting a change in the position of said valve and a second fixed damping restriction between said inlet and the opposite side of said diaphragm to control the rate of change in position of said diaphragm and thereby control the rate of change of position of said valve.

References Cited by the Examiner
UNITED STATES PATENTS

| | | | |
|---|---|---|---|
| 2,381,429 | 8/1945 | Bell et al. | 60—97 X |
| 2,931,168 | 5/1960 | Alexander et al. | 60—39.27 X |
| 2,938,339 | 5/1960 | Clarke | 60—39.27 |
| 2,942,416 | 6/1960 | Buckingham | 60—39.15 |
| 3,174,551 | 3/1965 | McCarthy | 60—39.15 X |
| 3,200,886 | 8/1965 | Magri et al. | 60—39.28 X |
| 3,234,740 | 2/1966 | Moore | 60—39.15 X |

JULIUS E. WEST, *Primary Examiner.*